(No Model.)
L. W. MOZINGO.
COMBINED WATER COOLER AND FILTER.
No. 406,054. Patented July 2, 1889.
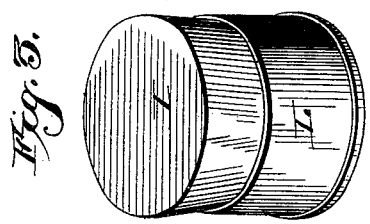
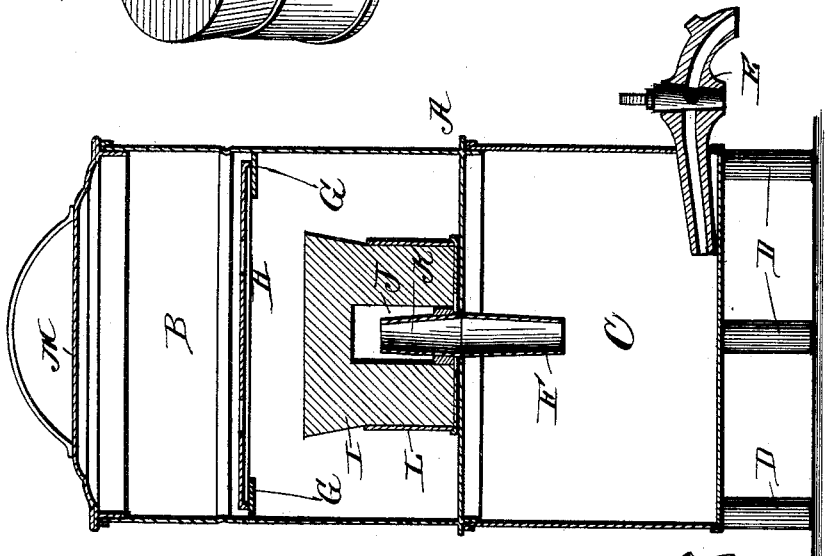
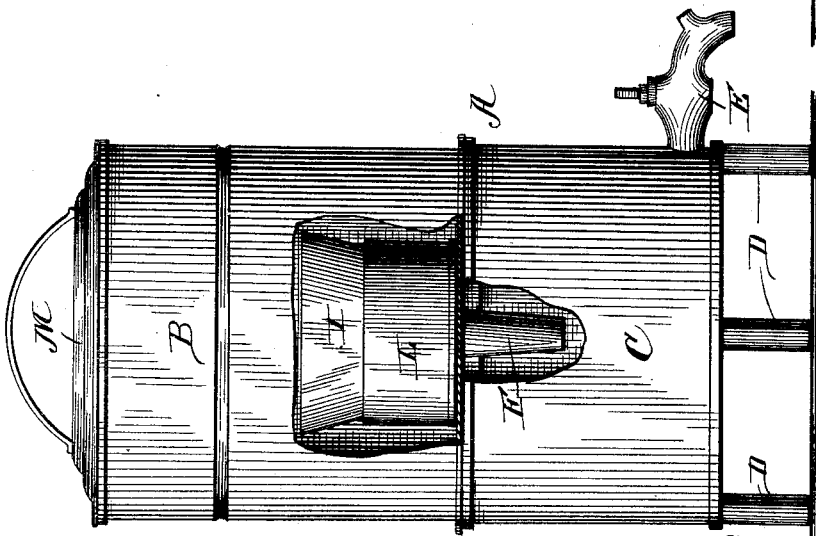
Witnesses
Henry G. Dieterich
R. W. Bishop
Inventor
Lewis W. Mozingo
By his Attorneys

UNITED STATES PATENT OFFICE.

LEWIS W. MOZINGO, OF KANSAS CITY, MISSOURI.

COMBINED WATER COOLER AND FILTER.

SPECIFICATION forming part of Letters Patent No. 406,054, dated July 2, 1889.

Application filed January 18, 1889. Serial No. 296,699. (No model.)

*To all whom it may concern:*

Be it known that I, LEWIS W. MOZINGO, a citizen of the United States, residing at Kansas City, in the county of Jackson and State of Missouri, have invented new and useful Improvements in Combined Water Coolers and Filters, of which the following is a specification.

My invention relates to improvements in combined water coolers and filters; and it consists in certain novel features hereinafter described and claimed.

In the accompanying drawings, Figure 1 is a side view with a part broken away. Fig. 2 is a vertical section, and Fig. 3 is a detail perspective view of the filtering-block.

Referring to the drawings by letter, A designates a cylindrical casing, which is constructed in two sections B C, the upper section B resting upon and supported by the lower section, and the said lower section being sometimes be advantageous, however, to form them separately, and for convenience in description I have so referred to them.

In practice the water is placed in the upper section B of the casing, being poured therein till it reaches about the level of the lugs G. The shelf H is then placed in position and the ice placed on the shelf. A cover M of ordinary construction is then placed over the upper end of the filter, and the device is ready for use. The water passes through the filtering-block and the outlet and feed tubes to the lower section or reservoir C, from which it can be drawn off in such quantities as may be desired.

It will be observed that my filter is very compactly arranged and is free of all intricate and complicated combinations and arrangements. By having the ice supported above the water it is caused to melt more slowly than if placed in the water. Furthermore,